(12) United States Patent
Chen (10) Patent No.: US 12,271,304 B2
(45) Date of Patent: Apr. 8, 2025

(54) OVERLAY SIZE DETERMINATIONS

(71) Applicant: HEWLETT-PACKARD DEVELOPMENT COMPANY, L.P., Spring, TX (US)

(72) Inventor: Wei-Jing Chen, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/261,099

(22) PCT Filed: Jan. 25, 2021

(86) PCT No.: PCT/US2021/014859
§ 371 (c)(1),
(2) Date: Jul. 11, 2023

(87) PCT Pub. No.: WO2022/159109
PCT Pub. Date: Jul. 28, 2022

(65) Prior Publication Data
US 2024/0061774 A1 Feb. 22, 2024

(51) Int. Cl.
G06F 12/06 (2006.01)
G06F 9/44 (2018.01)
G06F 9/4401 (2018.01)
G06F 12/02 (2006.01)

(52) U.S. Cl.
CPC ........ *G06F 12/0638* (2013.01); *G06F 9/4401* (2013.01); *G06F 12/0284* (2013.01)

(58) Field of Classification Search
CPC ............... G06F 12/0638; G06F 9/4401; G06F 12/0284; G06F 2212/1032; G06F 2212/1044
See application file for complete search history.

(56) References Cited

U.S. PATENT DOCUMENTS

| | | | |
|---|---|---|---|
| 7,962,684 B2 | 6/2011 | Struk et al. | |
| 7,992,103 B2 | 8/2011 | Gusmorino et al. | |
| 8,402,228 B2* | 3/2013 | Anand | G06F 9/544 710/52 |
| 10,114,754 B1* | 10/2018 | Pendharkar | G06F 12/12 |
| 10,353,636 B2 | 7/2019 | Kaushik et al. | |
| 10,776,050 B2 | 9/2020 | Popli et al. | |

(Continued)

FOREIGN PATENT DOCUMENTS

WO 2014/116977 A2 7/2014

*Primary Examiner* — Masud K Khan
(74) *Attorney, Agent, or Firm* — Quarles & Brady LLP (57) ABSTRACT

In an example, a non-transitory computer-readable storage medium storing instructions that, when executed by a processor of a computing device, cause the processor to maintain, via execution of a write filter executable on the computing device, an overlay region for a protected volume, the overlay region having a first size that occupies a portion of a system memory. Further, the processor may retrieve historical data that describes past behavior of the computing device with respect to the overlay region and a non-overlay region of the system memory. Furthermore, the processor may determine a second size for the overlay region based on the historical data. Prior to a boot of the computing device, the processor may store an instruction to modify the first size of the overlay region in accordance with the determined second size.

14 Claims, 6 Drawing Sheets

(56) References Cited

U.S. PATENT DOCUMENTS

| | | |
|---|---|---|
| 11,062,110 B2 | 7/2021 | Chung et al. |
| 2003/0140238 A1 | 7/2003 | Turkboylari |
| 2005/0027957 A1 | 2/2005 | Page et al. |
| 2007/0186070 A1 | 8/2007 | Federa et al. |
| 2018/0335968 A1* | 11/2018 | Pauley .................... G06F 3/068 |

* cited by examiner

OVERLAY SIZE DETERMINATIONS

BACKGROUND

In computing devices, an operating system may include a functionality that can prevent content of a storage medium (e.g., a flash media) from being changed at runtime. To accomplish this, a write filter may be provided to redirect writes that target the storage medium to a random-access memory (RAM), referred to as an overlay. Further, the write filter may protect the contents of and/or decrease wear on the storage medium by redirecting and caching writes in the overlay. The overlay is a memory space in RAM that tracks changes to the storage medium.

BRIEF DESCRIPTION OF THE DRAWINGS

Examples are described in the following detailed description and in reference to the drawings, in which.

DETAILED DESCRIPTION

Computing devices may include functionality that can prevent the content of a storage medium from being changed at runtime. The storage medium is a physical storage medium such as a disk, flash media, or the like. To prevent the content of the storage medium from being changed, a computing device may include a write filter to redirect writes that target the storage medium to a random-access memory (RAM), referred to as an overlay. The write filter may refer to a program that protects a protected volume by intercepting and redirecting any writes (e.g., application installations, settings changes, saved data, or the like) to the protected volume to the overlay. The write filter may start upon initiation of an operating system and perform functions between the operating system and a storage driver of the storage medium. The write filter may monitor reads and/or writes to the storage medium. Further, the write filter may intercept the reads and/or writes to the storage medium and determine which reads or writes have to be redirected to the overlay.

The term "protected volume" may refer to the storage medium or at least a portion of the storage medium in which any changes to the content stored therein can be redirected to the overlay.

Further, the overlay may be a memory space in the RAM that tracks changes to the protected volume. As a result, the writes may occur in the overlay rather than in the protected volume. Any data written to the overlay may be cleared/discarded when the computing device is booted. Thus, the write filter may protect the protected volume of a computing device by redirecting and caching writes in the overlay.

Further, a size of the overlay may impact user's use experience. For example, when an additional RAM is assigned to the overlay, the computing device can operate for an increased amount of time without boot (e.g., to clear up the overlay), however, the computing device may be left with significantly less RAM (i.e., the non-overlay) for applications, and vice versa. In some examples, the size of the overlay may be static and cannot be changed without booting. Hence, the computing device may be automatically booted when the overlay reaches a threshold (e.g., becomes 95% full) to allow sufficient memory for the operating system to perform housekeeping actions before the boot.

An administrator may configure an overlay size in multiple computing devices within an organization. In this example, configuring a fixed overlay size for the computing devices may not be suitable as the usage behavior of users may differ and may involve different overlay sizes based on the corresponding usage behavior. Hence, setting an appropriate overlay size for different users may be challenging.

Examples described herein may provide a computing device having a RAM. The RAM may be configurable to include a non-overlay region for use as a general-purpose RAM and an overlay region managed via execution of a write filter to protect a protected volume from modification. Further, the computing device may include a processor. During operation, the processor may retrieve historical data that describes past behavior of the computing device with respect to the overlay region and the non-overlay region over a period of time. Further, the processor may determine a modified size for the overlay region based on the historical data. The modified size may be different from a current size (e.g., a recently determined size or a size set by an administrator) of the overlay region. Furthermore, the processor may apply the determined modified size to a configuration of the write filter prior to a boot of the computing device. For example, the current size may refer to a size of the overlay region corresponding to a current session (i.e., prior to the boot of the computing device) and the modified size may refer to an appropriate size for the overlay region corresponding to a next session (i.e., after the boot of the computing device).

For example, the term "configuration of the write filter" may refer to next session configuration settings that can be affective after the next boot. Example configuration settings may include filter settings (on/off), overlay settings (type: RAM/disk, size, warning threshold, critical threshold, and the like), volume settings including file exclusions, registry exclusion settings, and the like. In the above example, the determined modified size may be applied to the configuration of the write filter by configuring the size associated with the overlay settings. In an example, the configuration of the write filter may be stored on a boot sector, the protected volume, a partition of the storage medium different from the protected volume, or any other storage device, which can be accessed via execution of the write filter. After the computing device is booted, the size of the overlay region is set to the modified size. An example depicting current session configuration settings and next session configuration settings that can be affective after a next boot is shown below:
Current Session Overlay Settings:
  Type: RAM
  Size: 2048 M B
  Warning threshold: 512 MB
  Critical threshold: 1024 MB
Next Session Overlay Settings:
  Type: RAM
  Size: 4096 MB
  Warning threshold: 512 MB
  Critical threshold: 1024 MB In response to the next boot of the computing device, the write filter may configure the overlay region in accordance with the modified size. In other words, the modified size is applied to the configuration of the write filter before the boot up. Further, the writer filter takes up the modified size on the boot up and manage the overlay according to the modified size. Thus, examples described herein may automatically set the size of the overlay based on past behavior of the computing device with respect to the overlay region and the non-overlay region.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

The term "boot" described herein may refer to a series of processes performed from the powering-on of the computing device to the completion of loading of an operating system and an operating system application. When the computing device is powered on, the computing device may undergo an initial set of operations to configure the hardware and programming of the computing device. This process may be referred to as a boot process. The boot process may be performed using a basic input/output system (BIOS), unified extensible firmware interface (UEFI), or the like. After a power button is activated, the computing device may first load in the BIOS to perform tasks such as performing power-on self-test (POST), detecting hardware, installing drivers, and loading in an operating system. The BIOS then gives control of the computing device to the operating system.

Figure 1:
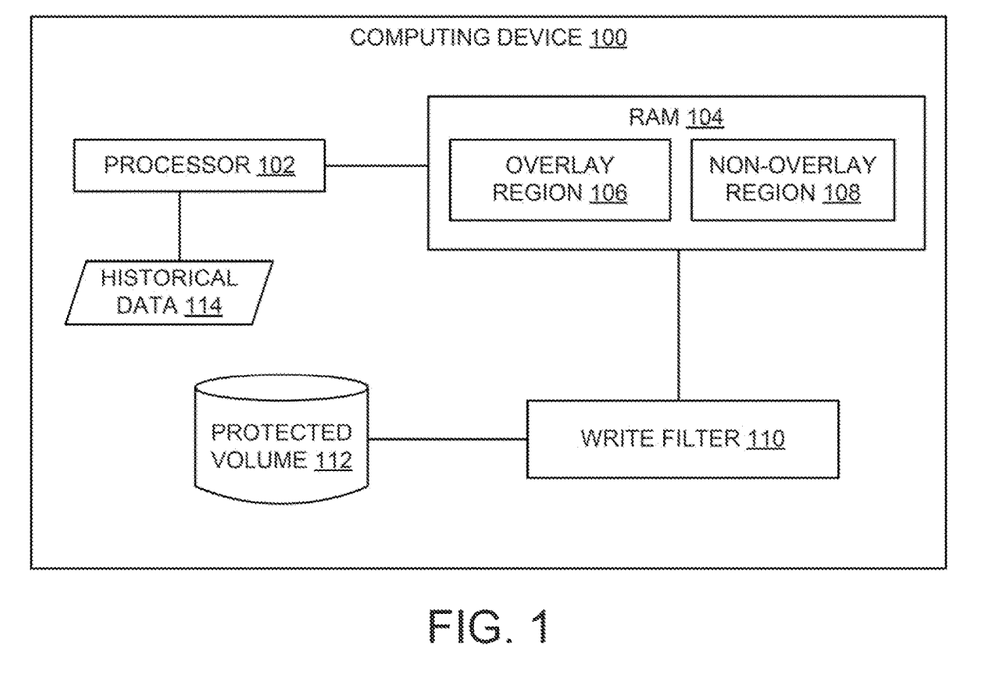
FIG. 1 is a block diagram of an example computing device, including a processor to determine a modified size for an overlay region based on historical data associated with the overlay region and a non-overlay region.

Turning now to the figures, FIG. 1 is a block diagram of an example computing device 100, including a processor 102 to determine a modified size for an overlay region 106 based on historical data associated with overlay region 106 and a non-overlay region 108. Example computing device 100 may include a thin client, a notebook computer, a tablet computer, a desktop computer, a mobile phone, or the like. Computing device 100 may communicate with a virtualization server (e.g., virtual desktop infrastructure (VDI) server serving a VDI environment) that performs at least a portion (or most) of program execution, processing, storage, and other tasks. Further, computing device 100 may include a write filter-enabled operating system. The write filter-enabled operating system may include an embedded operating system (e.g., a Windows operating system such as Windows Embedded Standard "WES"), a standard operating system that has a write filter (e.g., such as Windows 10 Enterprise, Windows 10 IOT Enterprise, or the like), or any operating system that has a write filter to prevent the content of a storage medium from being changed.

As shown in FIG. 1, computing device 100 may include a protected volume 112, a write filter 110, a processor 102, and a RAM 104. Further, RAM 104 may be configurable to include a non-overlay region 108 for use as a general-purpose RAM (e.g., a place to store and access data by applications) and overlay region 106 managed via execution of write filter 110 to protect protected volume 112 from modification. Example protected volume 112 may be a disk, flash media, or the like. In an example, write filter 110 may protect the protected volume 112 by intercepting and redirecting any writes (e.g., application installations, settings changes, saved data, or the like) to the protected volume 112 to overlay region 106. Further, processor 102 may be a type of central processing unit (CPU), microprocessor, or processing logic that interprets and executes machine-readable instructions stored in machine-readable storage medium in computing device 100.

During operation, processor 102 may obtain historical data 114 that describes past behavior of computing device 100 with respect to overlay region 106 and non-overlay region 108 over a period of time. In an example, historical data 114 may include historical data that identifies a boot of computing device 100 due to run out of overlay region 106 or non-overlay region 108, historical usage data associated with overlay region 106, historical usage data associated with non-overlay region 108, and/or the like. The term "run out" of overlay region 106 may refer to a consumption of overlay region 106 reaching a threshold (e.g., becomes 95% full) beyond which any write attempts to overlay region 106 may fail. The term "run out" of non-overlay region may refer to a consumption of non-overlay region 108 reaching a threshold (e.g., becomes 90% full). In an example, processor 102 may obtain historical data 114 corresponding to past couple of days, weeks, or the like. In another example, processor 102 may obtain historical data 114 after each boot up, before each reboot, periodically, or the like.

Further, processor 102 may detect an occurrence of a boot of computing device 100 due to run out of overlay region 106 or non-overlay region 108 based on historical data 114. Furthermore, processor 102 may determine a modified size for overlay region 106 in response to the detection. Example modified size may be different from a recently determined size of overlay region 106. In an example, processor 102 may determine an increased size that is greater than the recently determined size of overlay region 106 when the occurrence of the boot is due to run out of overlay region 106. In another example, processor 102 may determine a reduced size that is less that is than the recently determined size of overlay region 106 when the occurrence of the boot is due to run out of non-overlay region 108.

In an example, processor 102 may compute a maximum usage of overlay region 106 and a maximum usage of non-overlay region 108 corresponding to the period based on historical data 114. Further, processor 102 may determine the modified size (e.g., the increased size or the reduced size) for overlay region 106 based on the recently determined size of overlay region 106, a size of non-overlay region 108, the maximum usage of overlay region 106, and the maximum usage of non-overlay region 108.

In an example, to determine the increased size, processor 102 may determine an available non-overlay memory based on a difference between the maximum usage of the non-overlay region and the size of the non-overlay region.

Further, processor 102 may determine the modified size that is greater than the recently determined size by assigning at least a portion of the available non-overlay memory to the recently determined size of the overlay region.

In another example, to determine the reduced size, processor 102 may determine an available overlay memory based on a difference between the maximum usage of the overlay region and the recently determined size of the overlay region. Further, processor 102 may determine the modified size that is less than the recently determined size by assigning at least a portion of the available overlay memory to the size of the non-overlay region.

In other examples, processor 102 may compute an average or mean usage of overlay region 106 and an average or mean usage of non-overlay region 108 corresponding to the period based on historical data 114. Further, processor 102 may determine the modified size (e.g., the increased size or the reduced size) for overlay region 106 based on the recently determined size of overlay region 106, the size of non-overlay region 108, the average or mean usage of overlay region 106, and the average or mean usage of non-overlay region 108.

In an example, to determine the increased size, processor 102 may determine an available non-overlay memory based on a difference between the average or mean usage of the non-overlay region and the size of the non-overlay region. Further, processor 102 may determine the modified size that is greater than the recently determined size by assigning at least a portion of the available non-overlay memory to the recently determined size of the overlay region.

In an example, to determine the reduced size, processor 102 may determine an available overlay memory based on a difference between the average or mean usage of the overlay region and the recently determined size of the overlay region. Further, processor 102 may determine the modified size that is less than the recently determined size by assigning at least a portion of the available overlay memory to the size of the non-overlay region.

Similarly, processor 102 may also identify a usage pattern of overlay region 106 or non-overlay region 108 corresponding to the period and determine the modified size (e.g., the increased size or the reduced size) for overlay region based on the usage pattern. For example, the usage pattern may indicate that the usage of overlay region 106 may be higher on a particular day of a week (e.g., Tuesday) or a particular day of a month (e.g., 15$^{th}$ of every month) compared to other days, for instance, due to operating system updates, expected addition of an application, or the like. Accordingly, processor may determine the modified size that is greater than the current size based on the usage pattern.

Furthermore, processor 102 may store an instruction to configure overlay region 106 of RAM 104 in accordance with the determined modified size. The instruction to configure overlay region 106 may be stored in protected volume 112 or any other non-volatile storage device. In an example, processor 102 may store the instruction to configure overlay region 106 in response to a detection of a normal power off event (e.g., shutdown event, restart event, or the like), which involves a boot up of computing device 100. Further, processor 102 may, upon a boot of computing device 100, execute the stored instruction to configure overlay region 106 in accordance with the determined modified size.

The functions of the various elements shown in FIG. 1, including any functional blocks labeled as "processor(s)", may be provided using dedicated hardware as well as hardware capable of executing programs. When provided by a processor, the functions may be provided by a single dedicated processor, by a single shared processor, or by a plurality of individual processors, some of which may be shared. Further, explicit use of the term "processor" may not be construed to refer exclusively to hardware capable of executing programs, and may implicitly include, without limitation, digital signal processor (DSP) hardware, network processor, application specific integrated circuit (ASIC), field programmable gate array (FPGA), or the like. In some examples, other custom-built hardware may also be included.

Figure 2A:
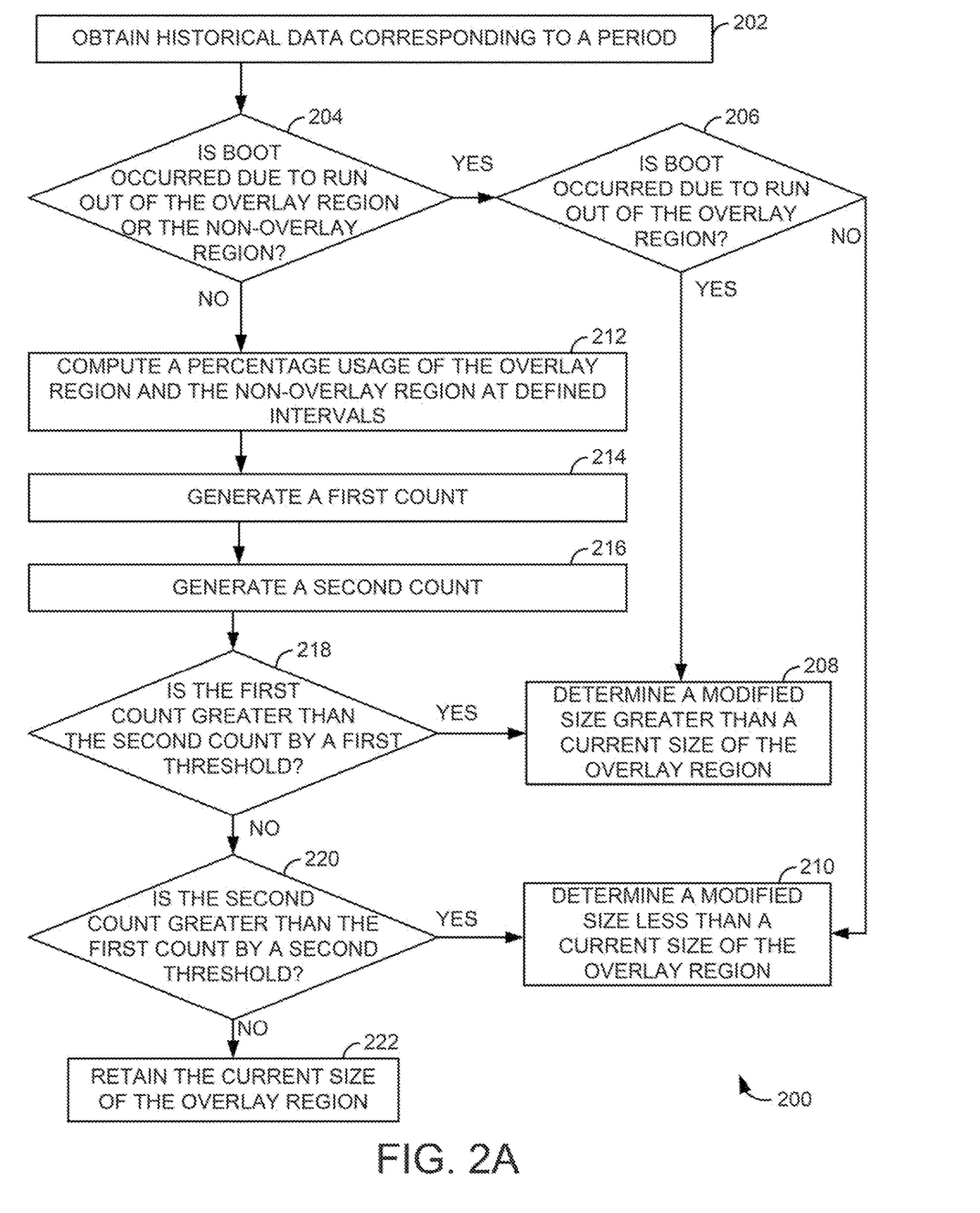
FIG. 2A is a flowchart illustrating an example method for determining a modified size for an overlay region based on historical data that describes past behavior of a computing device with respect to the overlay region and a non-overlay region.

FIG. 2A is a flowchart illustrating an example method 200 for determining a modified size for an overlay region based on historical data that describes past behavior of a computing device with respect to the overlay region and a non-overlay region. At 202, historical data that describes past behavior of a computing device with respect to an overlay region and a non-overlay region over a period of time may be obtained. In an example, the historical data may include historical data that identifies a boot of the computing device due to run out of the overlay region and the non-overlay region, historical usage data associated with the overlay region, and/or historical usage data associated the non-overlay region. At 204, a check may be made to detect whether a boot of the computing device occurred due to run out of the overlay region or the non-overlay region based on the historical data.

When the occurrence of the boot of the computing device due to run out of the overlay region or the non-overlay region is detected, at 206, a check may be made to determine whether the boot occurred due to run out of the overlay region. When the boot occurred due to run out of the overlay region, the modified size greater than a current size of the overlay region may be determined, at 208. When the boot occurred due to run out of the non-overlay region, the modified size less than the current size of the overlay region may be determined, at 210.

When the occurrence of the boot of the computing device due to run out of the overlay region or the non-overlay region is not detected, a percentage usage of the overlay region and a percentage usage of the non-overlay region may be computed at defined intervals over the period based on the historical data, at 212. At 214, a first count may be generated. The first count may include a number of times the percentage usage of the overlay region exceeds the percentage usage of the non-overlay region corresponding to the period. At 216, a second count may be generated. The second count may include a number of times the percentage usage of the non-overlay region exceeds the percentage usage of the overlay region corresponding to the period.

At 218, a check may be made to determine whether the first count is greater than the second count by a first threshold. When the first count is greater than the second count by the first threshold, the modified size greater than the current size of the overlay region may be determined, at 208. When the first count is not greater than the second count by the first threshold, a check may be made to determine whether the second count is greater than the first count by a second threshold, at 220. When the second count is greater than the first count by the second threshold, the modified size less than the current size of the overlay region may be determined, at 210. When the second count is not greater than the first count by the second threshold, the current size of the overlay region may be retained, at 222. In an example, the first threshold and the second threshold may be user-defined. Further, the first threshold and the second threshold may be same or different.

Figure 2B:
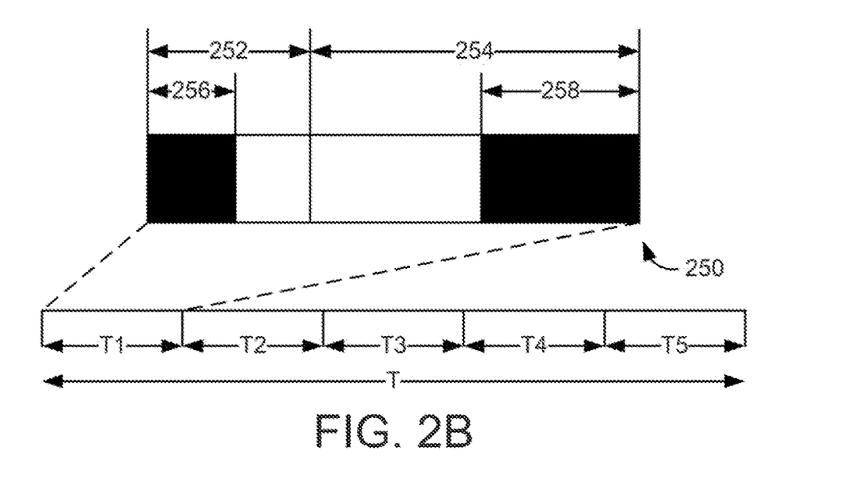
FIG. 2B is a schematic diagram illustrating an example RAM, depicting usage data associated with an overlay region and a non-overlay region at a defined interval.

FIG. 2B is a schematic diagram illustrating an example RAM 250, depicting usage data 256 and 258 associated with an overlay region 252 and a non-overlay region 254, respectively, at a defined interval. As shown in FIG. 2B, RAM 250 may include overlay region 252 and non-overlay region 254. During operation, a processor (e.g., processor 102 of FIG. 1) may obtain historical data (e.g., historical data 114 of FIG. 1) corresponding to a period T. Example historical data may include historical usage data 256 associated with overlay region 252 and historical usage data 258 associated with non-overlay region 254.

In an example, the processor may compute a percentage usage of overlay region 252 and a percentage usage of non-overlay region 254 at defined intervals (e.g., T1 to T5 corresponding to period T). For example, consider that a size of overlay region 252 is 6 GB, non-overlay region 254 is 10 GB, overlay usage data 256 is 3 GB, and non-overlay usage data 258 is 6 GB at defined interval T1. In this example, the percentage usage of overlay region 252 is 50% and non-overlay region 254 is 60%. The percentage usage of overlay region 252 is less than the percentage usage of non-overlay region 254. Thus, the second count is increased. Similarly, the percentage usage of overlay region 252 and non-overlay region 254 at multiple intervals T2 to T5 may be computed. Further, the first count and the second count may be generated accordingly.

Further, the processor may determine the modified size that is greater than the current size when the first count is greater than the second count by a first threshold. For example, consider that the first count is 4 and the second count is 1 corresponding to the period. Also, consider that the first threshold is 2. Since the first count is greater than the second count by the first threshold, the processor may determine an increased size for overlay region 252. In this example, the processor may evaluate that a significant amount of overlay region 252 is consumed over the period compared to that of non-overlay region 254. Hence, the processor may output to increase the overlay size (e.g., 6 GB) to an increased size (e.g., 7 GB).

Similarly, the processor may determine the modified size that is less than the current size when the second count is greater than the first count by a second threshold. For example, consider that the first count is 1, the second count is 4, and the second threshold is 2. In this example, since the second count is greater than the first count by the second threshold, the size of overlay region 252 may be reduced.

Figure 3:
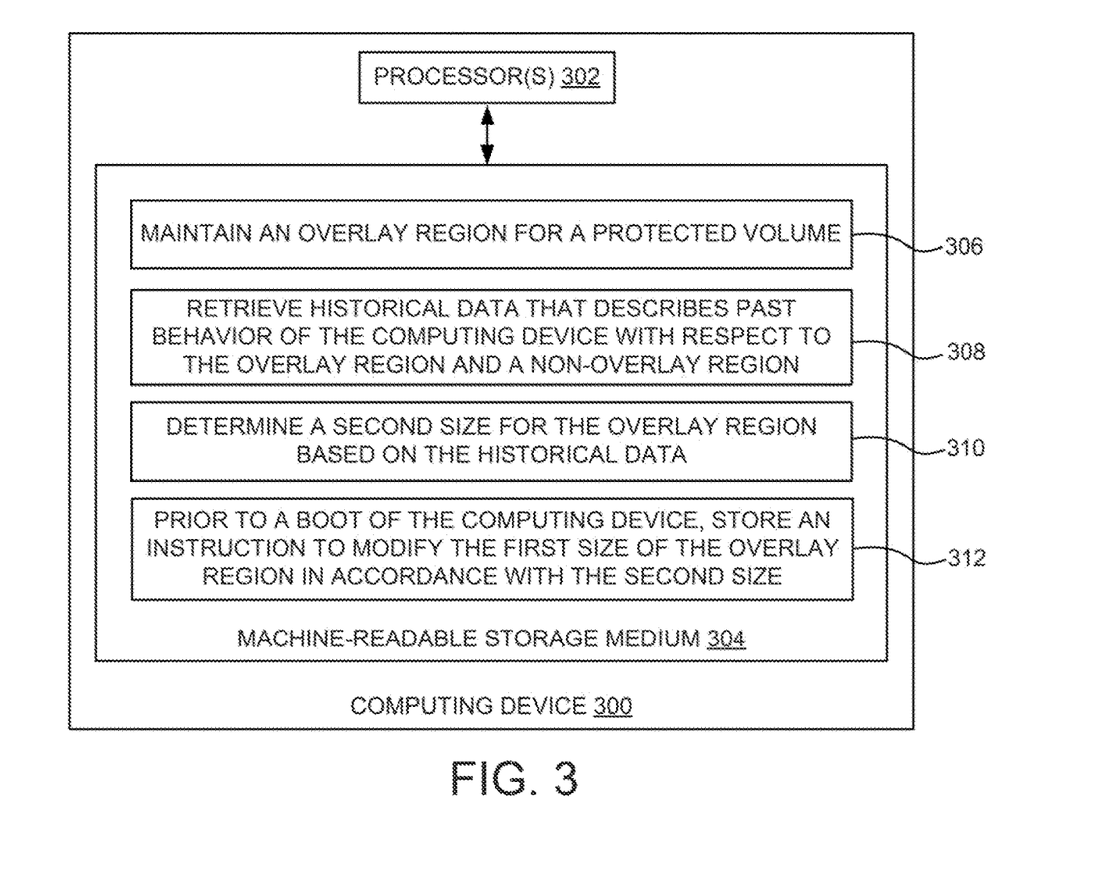
FIG. 3 is a block diagram of an example computing device including a non-transitory machine-readable storage medium storing instructions to determine a second size for an overlay region based on historical data associated with the overlay region and a non-overlay region.

FIG. 3 is a block diagram of an example computing device 300 including non-transitory machine-readable storage medium 304 storing instructions (e.g., 306 to 312) to determine a second size for an overlay region based on historical data associated with the overlay region and a non-overlay region. Computing device 300 may include a processor 302 and machine-readable storage medium 304 communicatively coupled through a system bus. Processor 302 may be any type of central processing unit (CPU), microprocessor, or processing logic that interprets and executes machine-readable instructions stored in machine-readable storage medium 304.

Machine-readable storage medium 304 may be a random-access memory (RAM) or another type of dynamic storage device that may store information and machine-readable instructions that may be executed by processor 302. For example, machine-readable storage medium 304 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 304 may be non-transitory machine-readable medium. Machine-readable storage medium 304 may be remote but accessible to computing device 300.

As shown in FIG. 3, machine-readable storage medium 304 may store instructions 306-312. In an example, instructions 306-312 may be executed by processor 302 to determine a second size for an overlay region based on historical data associated with the overlay region and a non-overlay region. Instructions 306 may be executed by processor 302 to maintain, via execution of a write filter executable on computing device 300, an overlay region for a protected volume. Example overlay region may include a first size that occupies a portion of a system memory.

Instructions 308 may be executed by processor 302 to retrieve historical data that describes past behavior of computing device 300 with respect to the overlay region and a non-overlay region of the system memory. In an example, historical data that describes the past behavior of computing device 300 may be retrieved from a log repository. In some examples, data may be periodically obtained from the write filter or operation system. Further, the data may be stored in the log repository. The log repository can be stored on the protected volume or machine-readable storage medium 304. In an example, instructions 308 to retrieve the historical data that describes the past behavior of computing device 300 may include instructions to:
  retrieve historical usage data associated with the overlay region, and
  retrieve historical usage data associated the non-overlay region.

Instructions 310 may be executed by processor 302 to determine a second size for the overlay region based on the historical data. In an example, instructions 310 to determine the second size for the overlay region may include instructions to compute a percentage usage of the overlay region at defined intervals over a period of time based on the historical usage data associated with the overlay region. Further, instructions may compute a percentage usage of the non-overlay region at the defined intervals based on the historical usage data associated with the non-overlay region. For example, the percentage usage of the overlay region, i.e., X % and the percentage usage of the non-overlay region, i.e., Y % may be computed at different intervals, i.e., Xt1%, Yt1%, Xt2%, Yt2%, and so on. Furthermore, instructions may determine the second size for the overlay region based on the percentage usage of the overlay region and the percentage usage of the non-overlay region at the defined intervals.

In an example, instructions 310 to determine the second size may include instructions to, at each of the defined intervals:
  increment a counter when the percentage usage of the overlay region is greater than the percentage usage of the non-overlay region, and
  decrement the counter when the percentage usage of the overlay region is not greater than the percentage usage of the non-overlay region.

In the above example, when Xt1%>Yt1% at the first interval, the counter C is incremented to C+1, else C is decremented to C−1. Similarly, when Xt2%>Yt2% at the first interval, C is incremented, else C is decremented. Further, instructions may determine the second size that is greater than the first size when the counter exceeds a first threshold. For example, when the counter C exceeds the first threshold (e.g., 10), the second size greater than the first size may be determined. Furthermore, instructions may determine the second size that is less than the first size when the counter drops below a second threshold. For example, when the counter C falls below the second threshold (e.g., −10), the second size less than the first size may be determined.

Instructions 312 may be executed by processor 302 to store an instruction to modify the first size of the overlay region in accordance with the determined second size prior to a next boot of computing device 300. Further, machine-readable storage medium 304 may store instructions to execute the stored instruction to configure the overlay region in accordance with the determined second size upon the boot of computing device 300.

Figure 4A:
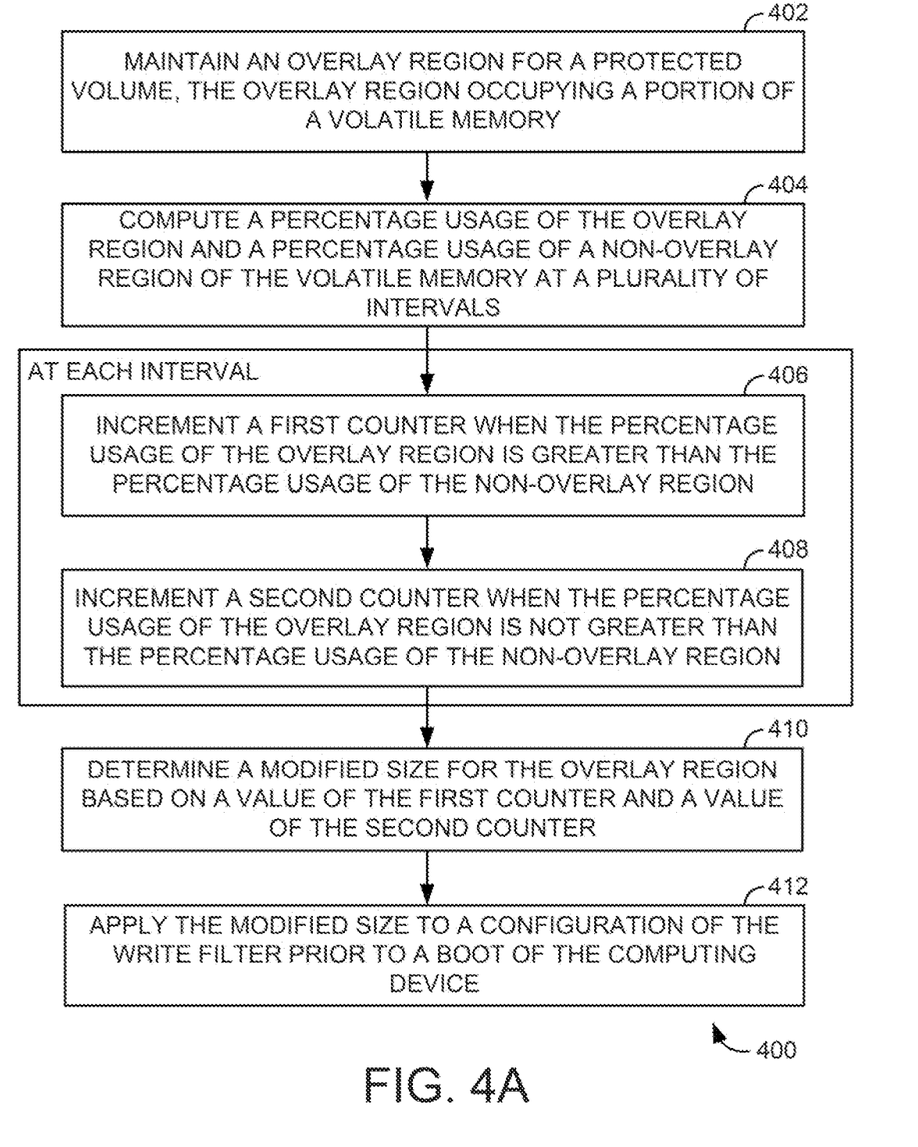
FIG. 4A is a flowchart illustrating an example method for determining a modified size for an overlay region based on a percentage usage of the overlay region and a non-overlay region at a plurality of intervals.

FIG. 4A is a flowchart illustrating an example method 400 for determining a modified size for an overlay region based on a percentage usage of the overlay region and a non-overlay region at a plurality of intervals. At 402, an overlay region for a protected volume may be maintained via a write filter executable on the computing device. Example overlay region may occupy a portion of a volatile memory of the computing device.

At 404, a percentage usage of the overlay region and a percentage usage of a non-overlay region of the volatile memory may be computed at a plurality of intervals. At 406, at each interval, a first counter may be incremented when the percentage usage of the overlay region is greater than the percentage usage of the non-overlay region. At 408, at each interval, a second counter may be incremented when the percentage usage of the overlay region is not greater than the percentage usage of the non-overlay region.

At 410, a modified size for the overlay region may be determined based on a value of the first counter and a value of the second counter. In an example, determining the modified size for the overlay region may include determining an increased size for the overlay region when the value of the first counter is greater than the value of the second counter by a threshold. An example method of determining the increased size for the overlay region is described in FIG. 4C.

In another example, determining the modified size for the overlay region may include determining a reduced size for the overlay region when the value of the first counter is less than the value of the second counter by the threshold. An example method of determining the reduced size for the overlay region is described in FIG. 4D. At 412, the modified size may be applied to a configuration of the write filter prior to a next boot of the computing device. In an example, a command may be executed to apply the modified size to the configuration of the write filter in response to a detection of a normal power off event (e.g., shutdown event, restart event, or the like), which involves a boot up of the computing device. The configuration may be affective after a next boot of the computing device. Further, the overlay region may be configured in accordance with the modified size during the next boot of the computing device.

Figure 4B:
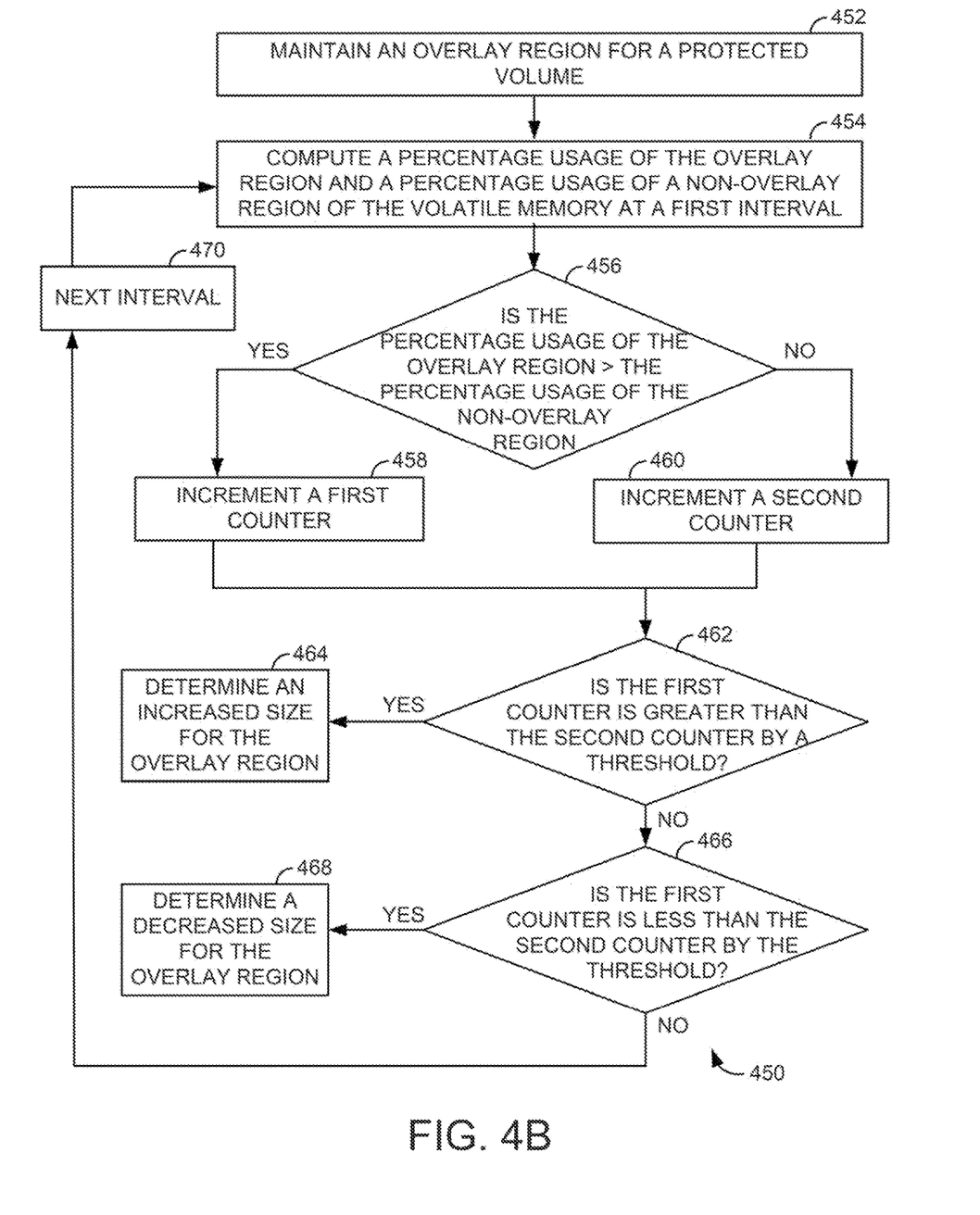
FIG. 4B is a flowchart illustrating an example method, such as those shown in FIG. 4A, depicting additional features.

FIG. 4B is a flowchart illustrating an example method 450, such as those shown in FIG. 4A, depicting additional features. At 452, an overlay region for a protected volume may be maintained via a write filter executable on the computing device. At 454, a percentage usage of the overlay region and a percentage usage of a non-overlay region of the volatile memory may be computed at a first interval.

At 456, a check may be made to determine whether the percentage usage of the overlay region is greater than the percentage usage of the non-overlay region. When the percentage usage of the overlay region is greater than the percentage usage of the non-overlay region, a first counter may be incremented, at 458. When the percentage usage of the overlay region is less than the percentage usage of the non-overlay region, a second counter may be incremented, at 460.

At 462, a check may be made to determine whether the first counter is greater than the second counter by a threshold. When the first counter is greater than the second counter by the threshold, an increased size for the overlay region may be determined, at 464. When the first counter is not greater than the second counter by the threshold, a check may be made to determine whether the first counter is less than the second counter by the threshold, at 466. When the first counter is less than the second counter by the threshold, a reduced size for the overlay region may be determined, at 468. When the first counter is not less than the second counter by the threshold, the percentage usage of the overlay region and the percentage usage of a non-overlay region may be computed at a next interval, at 470, and the process 450 is repeated until a modified size for the overlay region is determined.

Figure 4C:
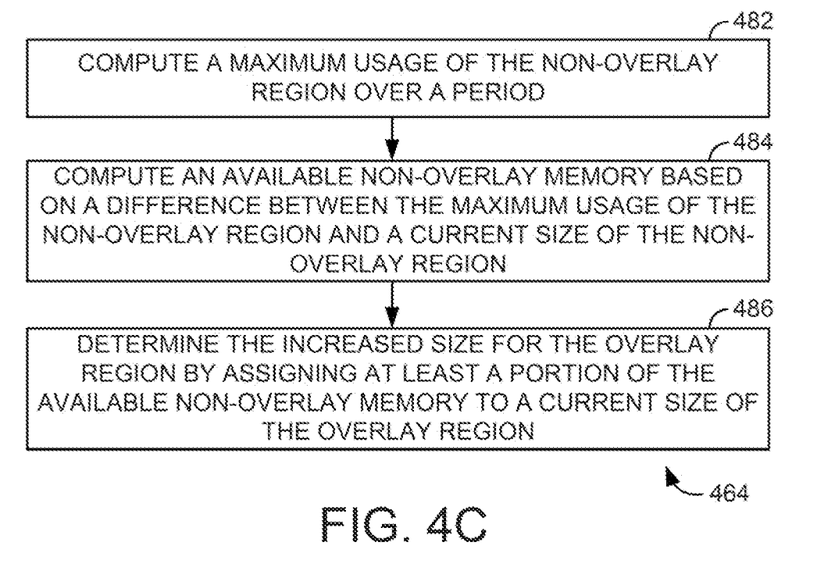
FIG. 4C is a flowchart illustrating an example method for determining an increased size for the overlay region.

FIG. 4C is a flowchart illustrating an example method (e.g., 464 of FIG. 4B) for determining the increased size for the overlay region. For example, similarly named elements of FIG. 4C may be similar in structure and/or function to elements described with respect to FIG. 4B. At 482, a maximum usage of the non-overlay region over a period of time may be computed. At 484, an available non-overlay memory may be computed based on a difference between the maximum usage of the non-overlay region and a current size of the non-overlay region. At 486, the increased size for the overlay region may be determined by assigning at least a portion of the available non-overlay memory to a current size of the overlay region.

For example, consider that the current size of the non-overlay region is 10 GB and the maximum usage of the non-overlay region over the period is 7 GB. In this example, the available non-overlay is determined as 3 GB. Therefore, at least a portion (e.g., 1 GB) of the available non-overlay memory (i.e., 3 GB) can be assigned to the current size of the overlay region to increase the current size of the overlay region.

Figure 4D:
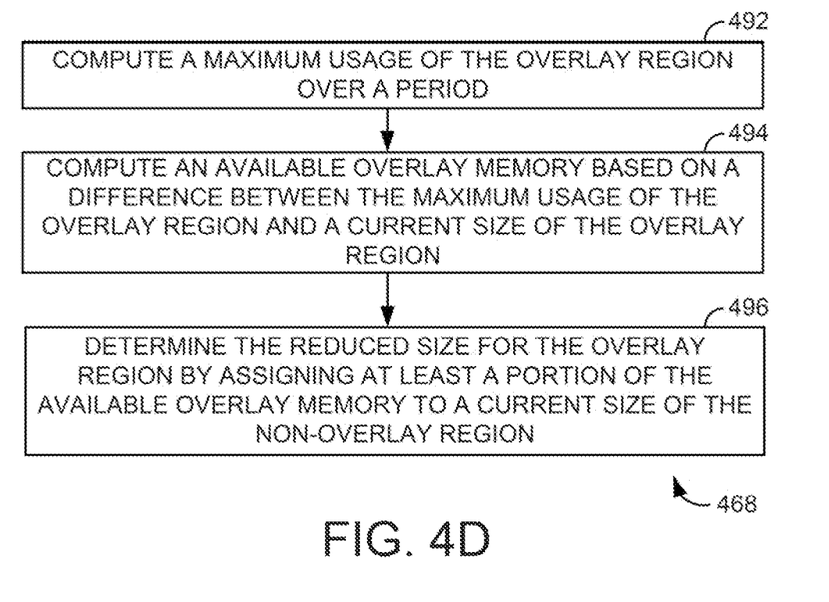
FIG. 4D is a flowchart illustrating an example method for determining a reduced size for the overlay region.

FIG. 4D is a flowchart illustrating an example method (e.g., 468 of FIG. 4B) for determining the reduced size for the overlay. For example, similarly named elements of FIG. 4D may be similar in structure and/or function to elements described with respect to FIG. 4B. At 492, a maximum usage of the overlay region over a period of time may be computed. At 494, an available overlay memory may be computed based on a difference between the maximum usage of the overlay region and a current size of the overlay region. At 496, the reduced size for the overlay region may be determined by assigning at least a portion of the available overlay memory to a current size of the non-overlay region.

For example, consider that the current size of the overlay region is 6 GB and the maximum usage of the overlay region over the period is 4 GB. In this example, the available overlay is determined as 2 GB. Therefore, at least a portion (e.g., 1 GB) of the available overlay memory (i.e., 2 GB) may be assigned to the current size of the non-overlay region to reduce the current size of the overlay region.

The method 200, 400, 450, 464, or 468 depicted in FIG. 2A, 4A, 4B, 4C, or 4D, respectively, represents generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. The processes of method 200, 400, 450, 464, or 468 may represent functions and/or actions performed by functionally equivalent circuits like analog circuits, digital signal processing circuits, application specific integrated circuits (ASICs), or other hardware components associated with the system. Furthermore, example method 200, 400, 450, 464, or 468 may not be intended to limit the implementation of the present application, but rather example method 200, 400, 450, 464, or 468 illustrates functional information to design/fabricate circuits, generate machine-readable instructions, or use a combination of hardware and machine-readable instructions to perform the illustrated processes.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A non-transitory computer-readable storage medium storing instructions that, when executed by a processor of a computing device, cause the processor to:
    maintain, via execution of a write filter executable on the computing device, an overlay region for a protected volume, the overlay region having a first size that occupies a portion of a system memory;
    retrieve historical data that describes past behavior of the computing device with respect to the overlay region and a non-overlay region of the system memory, the historical data including historical usage data associated with the overlay region and historical usage data associated with the non-overlay region;
    compute a percentage usage of the overlay region at defined intervals based on the historical usage data associated with the overlay region;
    compute a percentage usage of the non-overlay region at the defined intervals based on the historical usage data associated with the non-overlay region;
    determine a second size for the overlay region based on the percentage usage of the overlay region and the percentage usage of the non-overlay region at the defined intervals; and
    prior to a boot of the computing device, store an instruction to modify the first size of the overlay region in accordance with the determined second size.

2. The non-transitory computer readable storage medium of claim 1, further comprising instructions to:
    execute the stored instruction to configure the overlay region in accordance with the determined second size upon the boot of the computing device.

3. The non-transitory computer readable storage medium of claim 1, wherein instructions to retrieve the historical data that describes the past behavior of the computing device comprise instructions to:
    retrieve the historical usage data associated with the overlay region; and
    retrieve the historical usage data associated the non-overlay region.

4. The non-transitory computer readable storage medium of claim 1, wherein instructions to determine the second size comprise instructions to;
    at each of the defined intervals:
        increment a counter when the percentage usage of the overlay region is greater than the percentage usage of the non-overlay region; and
        decrement the counter when the percentage usage of the overlay region is not greater than the percentage usage of the non-overlay region;
    determine the second size that is greater than the first size when the counter exceeds a first threshold; and
    determine the second size that is less than the first size when the counter drops below a second threshold.

5. A computing device comprising:
    a protected volume;
    a write filter;
    a random-access memory (RAM), the RAM to include:
        a non-overlay region for use as a general-purpose RAM; and
        an overlay region managed via execution of the write filter to protect the protected volume from modification; and
    a processor to:
        obtain historical data that describes past behavior of the computing device with respect to the overlay region and the non-overlay region over a period of time;
        compute a percentage usage of the overlay region at defined intervals over the period of time based on historical data associated with the overlay region;
        compute a percentage usage of the non-overlay region at the defined intervals based on historical data associated with the non-overlay region;
        detect an occurrence of a boot of the computing device due to run out of the overlay region or the non-overlay region based on the historical data;
        determine, based on the percentage usage of the overlay region and the percentage usage of the non-overlay region at the defined intervals, a modified size for the overlay region in response to the detection, wherein the modified size is different from a recently determined size of the overlay region; and
        store an instruction to configure the overlay region of the RAM in accordance with the determined modified size.

6. The computing device of claim 5, wherein the processor is to:
    execute the stored instruction to configure the overlay region in accordance with the determined modified size upon a boot of the computing device.

7. The computing device of claim 5, wherein the processor is to:

determine an increased size that is greater than the recently determined size when the occurrence of the boot is due to run out of the overlay region; and determine a reduced size that is less that is than the recently determined size when the occurrence of the boot is due to run out of the non-overlay region.

8. The computing device of claim 5, wherein the processor is to:

compute a maximum usage of the overlay region and a maximum usage of the non-overlay region corresponding to the period based on the historical data; and determine the modified size for the overlay region based on the recently determined size of the overlay region, a size of the non-overlay region, the maximum usage of the overlay region, and the maximum usage of the non-overlay region.

9. The computing device of claim 8, wherein the processor is to:

determine an available non-overlay memory based on a difference between the maximum usage of the non-overlay region and the size of the non-overlay region; and determine the modified size that is greater than the recently determined size by assigning at least a portion of the available non-overlay memory to the recently determined size of the overlay region.

10. The computing device of claim 8, wherein the processor is to:

determine an available overlay memory based on a difference between the maximum usage of the overlay region and the recently determined size of the overlay region; and determine the modified size that is less than the recently determined size by assigning at least a portion of the available overlay memory to the size of the non-overlay region.

11. A method comprising:

maintaining, via a write filter executable on a computing device, an overlay region for a protected volume, the overlay region occupying a portion of a volatile memory;

computing a percentage usage of the overlay region and a percentage usage of a non-overlay region of the volatile memory at a plurality of intervals;

at each interval, incrementing a first counter when the percentage usage of the overlay region is greater than the percentage usage of the non-overlay region; and incrementing a second counter when the percentage usage of the overlay region is not greater than the percentage usage of the non-overlay region;

determining a modified size for the overlay region based on a value of the first counter and a value of the second counter; and applying the modified size to a configuration of the write filter prior to a boot of the computing device.

12. The method of claim 11, wherein determining the modified size for the overlay region comprises:

determining an increased size for the overlay region when the value of the first counter is greater than the value of the second counter by a threshold; and determining a reduced size for the overlay region when the value of the first counter is less than the value of the second counter by the threshold.

13. The method of claim 12, wherein determining the increased size for the overlay region comprises:

determining a maximum usage of the non-overlay region over a period of time;

determining an available non-overlay memory based on a difference between the maximum usage of the non-overlay region and a current size of the non-overlay region; and determining the increased size for the overlay region by assigning at least a portion of the available non-overlay memory to a current size of the overlay region.

14. The method of claim 12, wherein determining the reduced size for the overlay region comprises:

determining a maximum usage of the overlay region over a period of time;

determining an available overlay memory based on a difference between the maximum usage of the overlay region and a current size of the overlay region; and determining the reduced size for the overlay region by assigning at least a portion of the available overlay memory to a current size of the non-overlay region.

* * * * *